United States Patent
Maruta (10) Patent No.: US 9,819,912 B2
(45) Date of Patent: Nov. 14, 2017

(54) VIDEO MONITORING SYSTEM, VIDEO MONITORING METHOD, AND VIDEO MONITORING DEVICE

(71) Applicant: HITACHI KOKUSAI ELECTRIC INC., Tokyo (JP)

(72) Inventor: Satoshi Maruta, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 0 days.

(21) Appl. No.: 14/770,539

(22) PCT Filed: Mar. 14, 2014

(86) PCT No.: PCT/JP2014/056955
§ 371 (c)(1),
(2) Date: Aug. 26, 2015

(87) PCT Pub. No.: WO2014/148395
PCT Pub. Date: Sep. 25, 2014

(65) Prior Publication Data
US 2016/0014382 A1    Jan. 14, 2016

(30) Foreign Application Priority Data

Mar. 21, 2013  (JP) .................................. 2013-057858

(51) Int. Cl.
*H04N 7/18* (2006.01)
*G06K 9/00* (2006.01)

(52) U.S. Cl.
CPC ......... *H04N 7/188* (2013.01); *G06K 9/00362* (2013.01); *G06K 9/00771* (2013.01); *H04N 7/18* (2013.01); *H04N 7/181* (2013.01)

(58) Field of Classification Search
CPC .. G06K 9/00771; G06K 9/00362; H04N 7/18; H04N 7/188; H04N 7/181;
(Continued)

(56) References Cited

U.S. PATENT DOCUMENTS

2003/0227548 A1* 12/2003 Kawakami ............. H04N 7/183
348/152
2004/0117638 A1* 6/2004 Monroe ............. G06K 9/00221
713/186
(Continued)

FOREIGN PATENT DOCUMENTS

JP     2007-58763 A    3/2007
JP     2007-72781 A    3/2007
(Continued)

Primary Examiner — Mohammed Jebari
(74) Attorney, Agent, or Firm — Brundidge & Stanger, P.C.

(57) ABSTRACT

A technique useful for searching which part of a predetermined area a person who has not yet reached a target position in the predetermined area until a scheduled time, is located. A boarding passenger management device and a boarding passenger reception terminal obtain a boarding passenger management number of the person who enters a boarding lobby, a monitoring camera captures an image of the person, monitoring cameras installed in association with multiple division areas capture an image of each of the division areas. The boarding passenger management device identifies the person who has not yet reached the boarding gate even though it is after the scheduled time, and the boarding passenger management device and the face feature quantity search device identify a division area where an image of the person considered to be a not-yet arrived target person is captured.

8 Claims, 7 Drawing Sheets

(58) Field of Classification Search
CPC .............. H04N 7/183; G08B 13/19656; G07C 9/00087; G07C 9/00103; G07B 15/00
See application file for complete search history.

(56) References Cited

U.S. PATENT DOCUMENTS

| | | | |
|---|---|---|---|
| 2005/0002530 A1* | 1/2005 | Kogan | H04N 21/40 380/255 |
| 2005/0089198 A1* | 4/2005 | Ono | G06K 9/00255 382/115 |
| 2005/0205668 A1* | 9/2005 | Sogo | G07C 9/00087 235/382 |
| 2005/0206726 A1* | 9/2005 | Yoshida | H04N 7/181 348/143 |
| 2005/0256724 A1* | 11/2005 | Rasin | G06Q 10/02 705/5 |
| 2006/0055512 A1* | 3/2006 | Chew | G06K 9/00885 340/5.82 |
| 2007/0046426 A1* | 3/2007 | Ishibashi | G07C 9/00087 340/5.52 |
| 2007/0092245 A1* | 4/2007 | Bazakos | G06K 9/00255 396/427 |
| 2007/0222595 A1* | 9/2007 | Motteram | G06Q 10/06 340/572.1 |
| 2009/0303329 A1* | 12/2009 | Morisaki | H04N 7/183 348/159 |
| 2011/0019003 A1* | 1/2011 | Asa | G06K 9/00221 348/159 |

FOREIGN PATENT DOCUMENTS

| | | |
|---|---|---|
| JP | 2011-029737 A | 2/2011 |
| WO | 2005/055151 A1 | 6/2005 |

* cited by examiner

FIG. 5

VIDEO MONITORING SYSTEM, VIDEO MONITORING METHOD, AND VIDEO MONITORING DEVICE

CROSS-REFERENCE TO RELATED APPLICATION

This Application is a National Stage filing under 35 US.C. §371 of PCT Application No. PCT/JP2014/056955 filed on Mar. 14, 2014, which claims Priority of Japanese Application No. 2013-057858 filed Mar. 21, 2013, the disclosures of which are hereby incorporated herein by reference in their entirety.

BACKGROUND OF THE INVENTION

Field of the Invention

The present invention relates to a video monitoring system for searching a target person from a monitoring video.

Description of the Related Art

In the past, an on-time performance rate (on-time arrival rate) is regarded as important in air carriers, and the on-time performance rate (on-time arrival rate) has become one of important factors used by clients to select air carriers. Each air carrier is carrying out various kinds of measures to increase the on-time performance rate, and one of such measures includes a search of a not-yet boarded passenger. More specifically, when there is a client who has not yet boarded the plane (hereinafter referred to as a not-yet boarded passenger) even though the departure time is approaching although he or she is a client who is planning to board the plane (hereinafter referred to as a boarding passenger). For example, together with a paging by means of announcement, a ground worker runs around with a walkie-talkie on one hand to search the passenger, so that the air carrier is coping with getting the plane to somehow depart on time. In addition, when the boarding time is approaching, an air carrier provides attention-attraction by means of mail distribution to boarding passengers who have registered cellular phone mails.

CITATION LIST

Patent Literature

Patent Literature 1: JP 2011-029737 A

SUMMARY OF THE INVENTION

Figure 7:
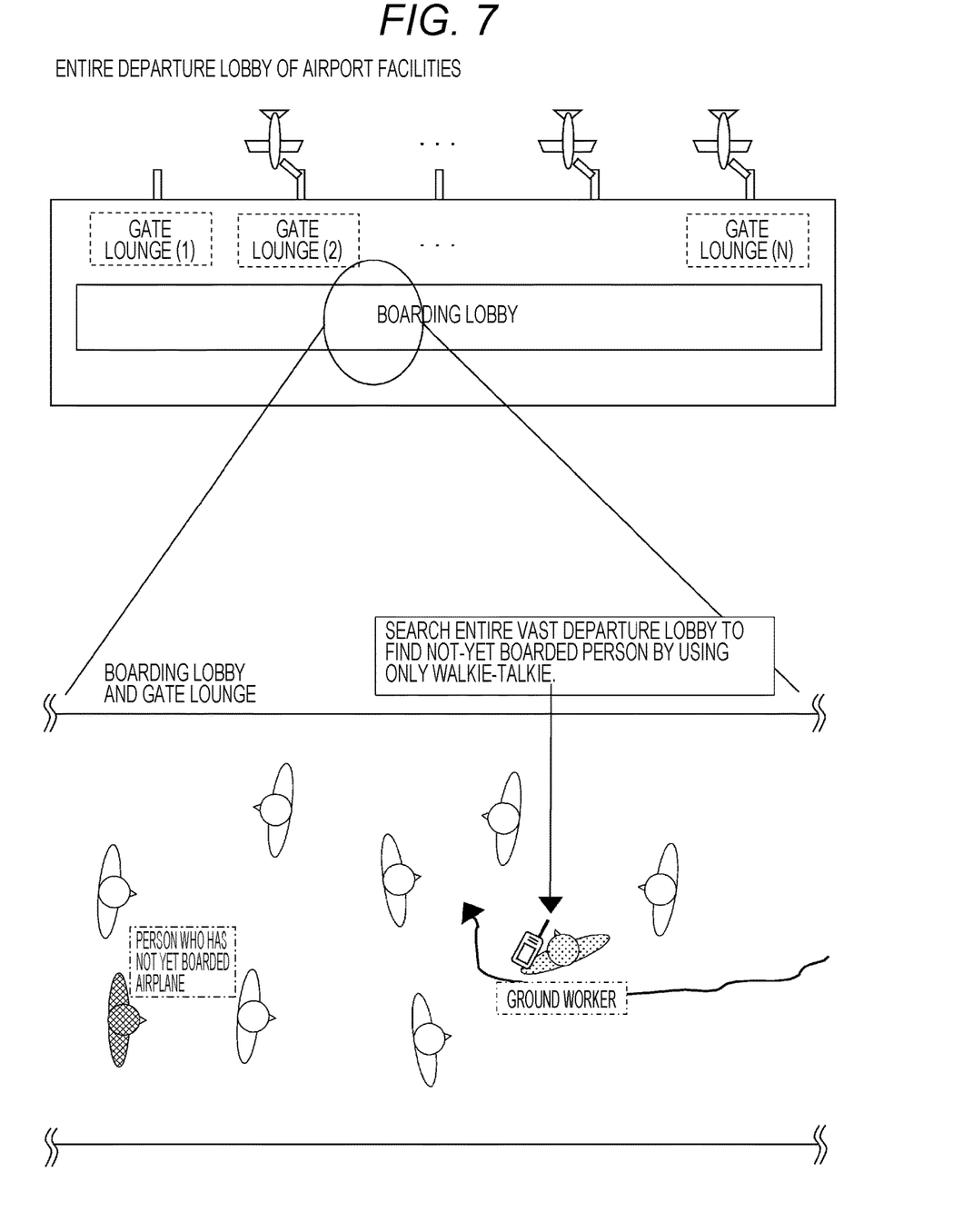
FIG. 7 is a figure illustrating how a not-yet boarded passenger is searched in airport facilities.

FIG. 7 shows how a not-yet boarded passenger is searched in airport facilities. When the start time of boarding passes, a boarding passenger presents a medium recorded with boarding passenger information (IC card, Osaifu keitai (cell-phone wallet) (registered trademark), two-dimensional bar-code, and the like) to the boarding gate terminal, and passes the boarding gate, and then, the passenger boards the target airplane. A ground worker finds a not-yet boarded passenger (a person who has not yet passed the boarding gate) from information collected by the boarding gate terminal, and at a certain specified time, the ground worker copes with this by paging the passenger by means of announcements in the airport facilities or searching the passenger by running around with a walkie-talkie on one hand. However, such measures are accompanied by physical fatigue which is caused because the ground worker runs around and searches a vast departure lobby, and therefore, an improvement is desired. One such improvement methods includes a measure for providing attention-attraction by means of mail distribution to an onboard passenger who has a portable terminal and preventing occurrence of a not-yet boarded passenger in advance, but not all the boarding passengers necessarily have a portable terminal capable of receiving mails, and this measure is insufficient.

The present invention is made in view of the above conventional circumstances, and it is an object of the present invention to suggest a technique useful for searching which part of a predetermined area a person who has not yet reached a target position in the predetermined area until a scheduled time, is located.

In order to achieve the above object, the present invention suggests the following video monitoring system. More specifically, an exemplary embodiment of the video monitoring system according to the present invention includes first obtaining unit which obtains identification information about a target person from a recording medium held by a target person who enters a predetermined area, first image-capturing unit which captures a face image of the target person whose identification information is obtained by the first obtaining unit, second image-capturing unit which captures an image of each of a plurality of division areas obtained by dividing the predetermined area into multiple areas, second obtaining unit which obtains identification information about the target person from the recording medium held by the target person at a target position where the target person who entered the predetermined area is to reach, not-yet arrived person identifying unit which identifies the target person who has not yet reached the target position on the basis of the identification information about the target person obtained by the first obtaining unit and the identification information about the target person obtained by the second obtaining unit, and not-yet arrived person position estimating unit which identifies a division area where an image of a person considered to be the target person identified by the not-yet arrived person identifying unit is captured, on the basis of a feature quantity of the face image captured by the first image-capturing unit with regard to the target person identified by the not-yet arrived person identifying unit and a feature quantity of a face image of a person included in a video captured in the plurality of division areas by the second image-capturing unit. In the video monitoring system according to the present invention, the second obtaining unit obtains the identification information about the target person from the recording medium held by the target person at the target position where the target person who entered the predetermined area is to reach by a predetermined time, and the not-yet arrived person identifying unit identifies the target person who has not yet reached the target position at the predetermined time on the basis of the identification information about the target person obtained by the first obtaining unit and the identification information about the target person obtained by the second obtaining unit.

According to the above configuration, a rough position (division area) where there is a person considered to be the target person who has not yet reached the target position in the predetermined area by the scheduled time can be estimated, and this is useful for searching the target person who has not yet arrived from the predetermined area.

In this case, the first image-capturing unit may perform image-capturing when the first obtaining unit obtains the identification information, so that the face image of the target person is captured, or image-capturing may be performed at all times, and the captured face image may be identified at a point in time when the first obtaining unit obtains the identification information, and this may be treated as the face image of the target person.

The second image-capturing unit may not capture the image of the entire division area, and may capture an image of a person who move across division areas. In this case, an arrangement capable of capturing an image of a person moving across division areas includes an arrangement in which second image-capturing unit which captures an image of one of the division areas and second image-capturing unit which captures an image of the other of the division areas are arranged in the directions opposite to each other with respect to a line dividing the two division areas, and with this arrangement, the number of installed second image-capturing unit can be reduced.

In the not-yet arrived person identifying unit, for example, the feature quantity of the face image of the target person identified by the not-yet arrived person identifying unit is adopted as the search key, and the similar face image search is performed to search a face image having a feature quantity of which degree of similarity with the feature quantity of the face image serving as the search key is equal to or more than a threshold value from the video captured by the second image-capturing unit. Accordingly, a person of which feature quantity of the face image is similar to the target person who has not yet arrived (a person considered to be the target person who has not arrived) can be searched efficiently, and the division area in which the image of the person considered to be the target person who has not yet arrived was captured can be identified on the basis of the search result.

In the similar face image search, multiple persons who are considered to be the target persons who have not yet arrived may be searched, but in this case, one of multiple searched persons is selected in view of one or both of the degree of similarity or the recency of the shooting time, and the division area may be identified, and the division area may be identified for each of the multiple searched persons. Multiple first image-capturing unit may be provided, and these first image-capturing unit may capture images of the face images of the target person who has not yet arrived from multiple directions, and the similar face image search may be performed by using the feature quantity of the face image in each direction as the search key, so that the accuracy for searching the person similar to the target person who has not yet arrived can be enhanced.

The video monitoring system according to the present invention further includes display unit which displays a face image captured by the first image-capturing unit with regard to the target person identified by the not-yet arrived person identifying unit, the face image of the person considered to be the target person, and the division area where the image of the person is captured. Therefore, even when there are multiple persons who are considered to be the target persons who have not yet arrived, the user can visually determine which person is the target person, and the user can find in which division area the person was located.

In this case, when there are multiple persons considered to be the target persons who have not yet arrived, the degree of emphasis of the display of the face image of each person may be changed or the position of the display may be changed in accordance with the degree of similarity with the target person who has not yet arrived and in accordance with the shooting time, and therefore, this makes it easy to find which person is the target person from among the multiple face images.

In the video monitoring system according to the present invention, the not-yet arrived person position estimating unit identifies the division area where the image of the person considered to be the target person identified by the not-yet arrived person identifying unit is captured, on the basis of a feature quantity of the face image captured by the first image-capturing unit with regard to the target person identified by the not-yet arrived person identifying unit, a feature quantity of an image portion other than the face image, a feature quantity of the face image of the person included in the video captured in the plurality of division areas by the second image-capturing unit, and a feature quantity of an image portion other than the face image. As described above, not only in view of the feature quantity of the face image but also in view of the feature quantity of the image portion other than the face image, estimation is performed to determine whether the person included in the video captured by the second image-capturing unit is the target person who has not yet arrived, so that the accuracy for searching the person similar to the target person who has not yet arrived can be further enhanced.

In this case, the video monitoring system according to the present invention can be applied to various kinds of scenes for searching a person who has not yet reached a target position in a predetermined area by a scheduled time. For example, when the video monitoring system according to the present invention is applied to searching of a not-yet boarded passenger in airport facilities, the first obtaining unit may obtain identification information about a target person who enters a boarding lobby area in a security inspection area of airport facilities, the first image-capturing unit may capture an image of a target person who enters the boarding lobby area, the second image-capturing unit may capture an image of multiple division areas obtained by dividing a boarding lobby area into multiple areas, the second obtaining unit may obtain the identification information about the target person at the boarding gate which the target person who entered the boarding lobby area is to reach by the scheduled time, the not-yet arrived person identifying unit may identify the target person who has not yet reached the boarding gate even though it is after the scheduled time, the not-yet arrived person position estimating unit may identify the division area in the boarding lobby area where the image of the person considered to be the target person identified by the not-yet arrived person identifying unit is captured.

According to the present invention, a rough position (division area) where there is a person considered to be the target person can be estimated, and this is useful for searching the target person who has not yet arrived the target position by the scheduled time from the predetermined area.

DESCRIPTION OF EMBODIMENTS

Figure 1:
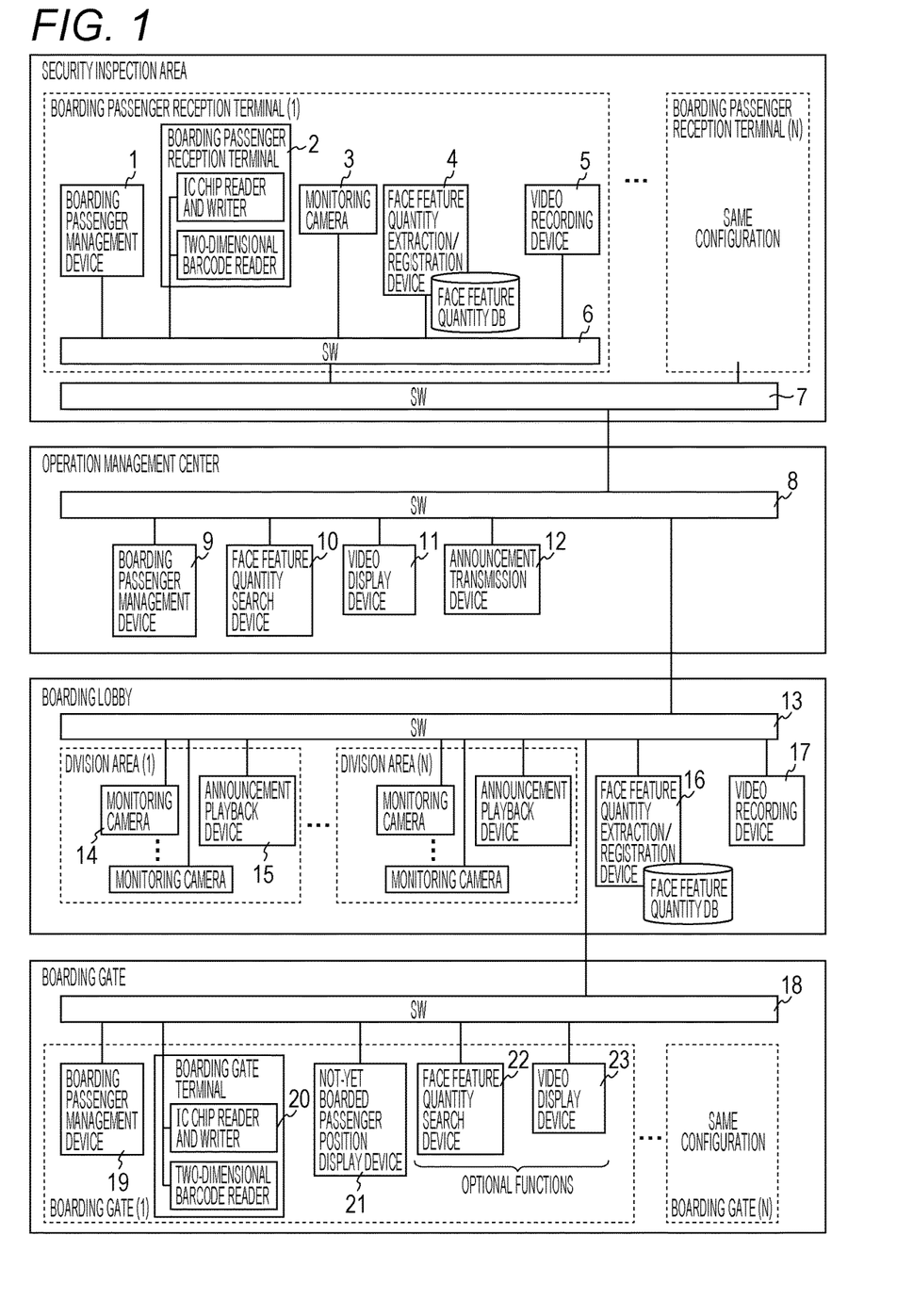
FIG. 1 is a figure illustrating an exemplary example of a configuration of a not-yet boarded passenger search system to which the present invention is applied.

An exemplary embodiment of the present invention will be explained with reference to drawings. FIG. 1 illustrates an exemplary example of a configuration of a not-yet boarded passenger search system to which a video monitoring system according to the present invention is applied. The not-yet boarded passenger search system according to the present exemplary example is constituted by blocks of a security inspection area, an operation management center, a boarding passenger lobby, and a boarding gate, and the blocks are connected with each other in a communicative manner.

The block of the security inspection area includes multiple boarding passenger reception systems. Each boarding passenger reception system includes a boarding passenger management device 1, a boarding passenger reception terminal 2, a monitoring camera 3, a face feature quantity extraction/registration device 4, and a video recording device 5, and they are connected via a network switch 6 in a communicative manner. The network switch 6 of each boarding passenger reception system is connected to a network switch 7 of a higher level.

The block of the operation management center includes a boarding passenger management device 9, a face feature quantity search device 10, a video display device 11, and an announcement transmission device 12, and they are connected via a network switch 8 in a communicative manner.

The block of the boarding passenger lobby includes one or more monitoring cameras 14 and announcement playback devices 15 provided for each area made by dividing the boarding passenger lobby into multiple areas, a face feature quantity extraction/registration device 16, and a video recording device 17, and they are connected via a network switch 13 in a communicative manner.

The block of the boarding gate includes a boarding passenger management device 19, a boarding gate terminal 20, and a not-yet boarded passenger position display device 21 for each of the multiple boarding gates, and they are connected via a network switch 18 in a communicative manner. Each boarding gate system according to the present example includes a face feature quantity search device 22 and a video display device 23 as options, and they are also connected via the network switch 18 in a communicative manner.

In the present exemplary example, each of the number of boarding passenger reception systems in the block of the security inspection area, the number of division areas in the block of the boarding passenger lobby, and the number of boarding gates in the block of the boarding gate is N which is the same number, but these numbers may be different from each other.

Operation of the not-yet boarded passenger search system according to the present exemplary example will be explained in a chronological flow. The boarding passenger proceeds to the security inspection area, the boarding lobby, and then the boarding gate, and boards the target airplane. First, in the security inspection area, the boarding passenger presents a boarding passenger information recording medium recorded with boarding passenger information such as the name of the boarding passenger, the airplane to be boarded (passport, e-ticket, IC card, Osaifu keitai (cellphone wallet) (registered trademark), two-dimensional barcode, and the like) to the boarding passenger reception terminal 2 to have the boarding passenger information to be read and issue a boarding guidance, and enters the boarding lobby after obtaining information about the flight number of the air plane to be boarded, the seat number, the boarding gate, and the like. In this case, the boarding passenger reception terminal 2 according to the present example includes an information reading unit in various formats such as an IC chip reader and writer and a two-dimensional barcode reader in order to cope with existence of various kinds of boarding passenger information recording media.

In the security inspection area, an operation for presenting the boarding passenger information recording medium to the boarding passenger reception terminal 2 to have the boarding passenger information to be read is adopted as a trigger, and the monitoring camera 3 installed in proximity to the boarding passenger reception terminal 2 captures a video including the face of the boarding passenger with the monitoring camera 3 installed in proximity to the boarding passenger reception terminal 2, and the video recording device 5 records the video. With the above operation as the trigger, the boarding passenger management device 1 issues a boarding passenger management number which is "a number of uniquely managing the boarding passenger" such as an air ticket number, and thereafter, this boarding passenger management number is used to manage each boarding passenger. More specifically, while the boarding passenger passes the security inspection area and enters the boarding lobby, the boarding passenger management number of the boarding passenger (identification information) and the face image are obtained.

Thereafter, the face feature quantity extraction/registration device 4 reads the recorded video including the face of the boarding passenger from the video recording device 5, extracts the feature quantity of the face of the boarding passenger on the basis of the video, and the boarding passenger management device 1 calls the boarding passenger management number issued when the video is captured (when the boarding passenger reception terminal 2 issues the ticket), and registers the boarding passenger management number to the face feature quantity database in such a format that the data of the face feature quantity and the boarding passenger management number are associated with each other. In the present exemplary example, the video captured by the monitoring camera 3 is recorded to the video recording device 5, the face feature quantity is swiftly extracted and registered to the database, but the extraction of the face feature quantity and the registration to the database may be performed at a point in time when a similar face image search explained later is carried out.

In this case, the extraction of the face feature quantity is carried out as follows for example. First, a publicly known face detection technique is used to determine whether there is a face in the video, and when it is determined that there is a face, the coordinate of the region thereof is calculated, and the face image region in the video is identified. Subsequently, the face image region is analyzed, and a vector component, a statistics value, and the like statistically presenting difference of each individual are detected from the shape and the direction of the contour of the face, the color of skin, and the size, the shape, the arrangement relationship, and the like of the main constituent elements of the face (eyes, nose, mouth, and the like), and they are recorded upon being associated, as data of the face feature quantity, with the boarding passenger management number.

In addition to the extraction of the face feature quantity of the boarding passenger, extraction of other personal feature quantity contributing to the identification of the boarding passenger may be performed. For example, a case where a feature quantity of clothes worn by a boarding passenger is extracted will be explained. First, techniques such as a publicly-known dynamic programming are used to extract the contour of a person, and the existence of worn clothes (clothes) is detected from the distribution of the colors in the contour and the characteristics in the frequency of the texture (frequency distribution and the like obtained whey FFT and wavelet transformation and the like are performed) and the coordinate of the region is calculated, and the clothes-worn region in the video is identified. Subsequently, in the clothes-worn region, the distribution of the colors of the clothes and the feature quantity in the frequency are detected, and they are recorded as data of the clothes feature quantity in association with the boarding passenger management number.

The boarding passengers who have proceeded to the boarding lobby wait in the area of the boarding lobby until the start time of boarding comes. In this case, the boarding lobby of the airport facilities has a vast area in general. For this reason, if an environment which captures videos including the faces of the boarding passengers is tried to be established in this area, it is expected that an enormous number of monitoring cameras have to be installed. However, this increased the cost of installation and operation, which is not practical. Therefore, the not-yet boarded passenger search system according to the present example, a concept of area division is used so that the monitoring cameras are installed in such a manner that the entire boarding lobby is roughly divided into multiple areas.

Figure 2:
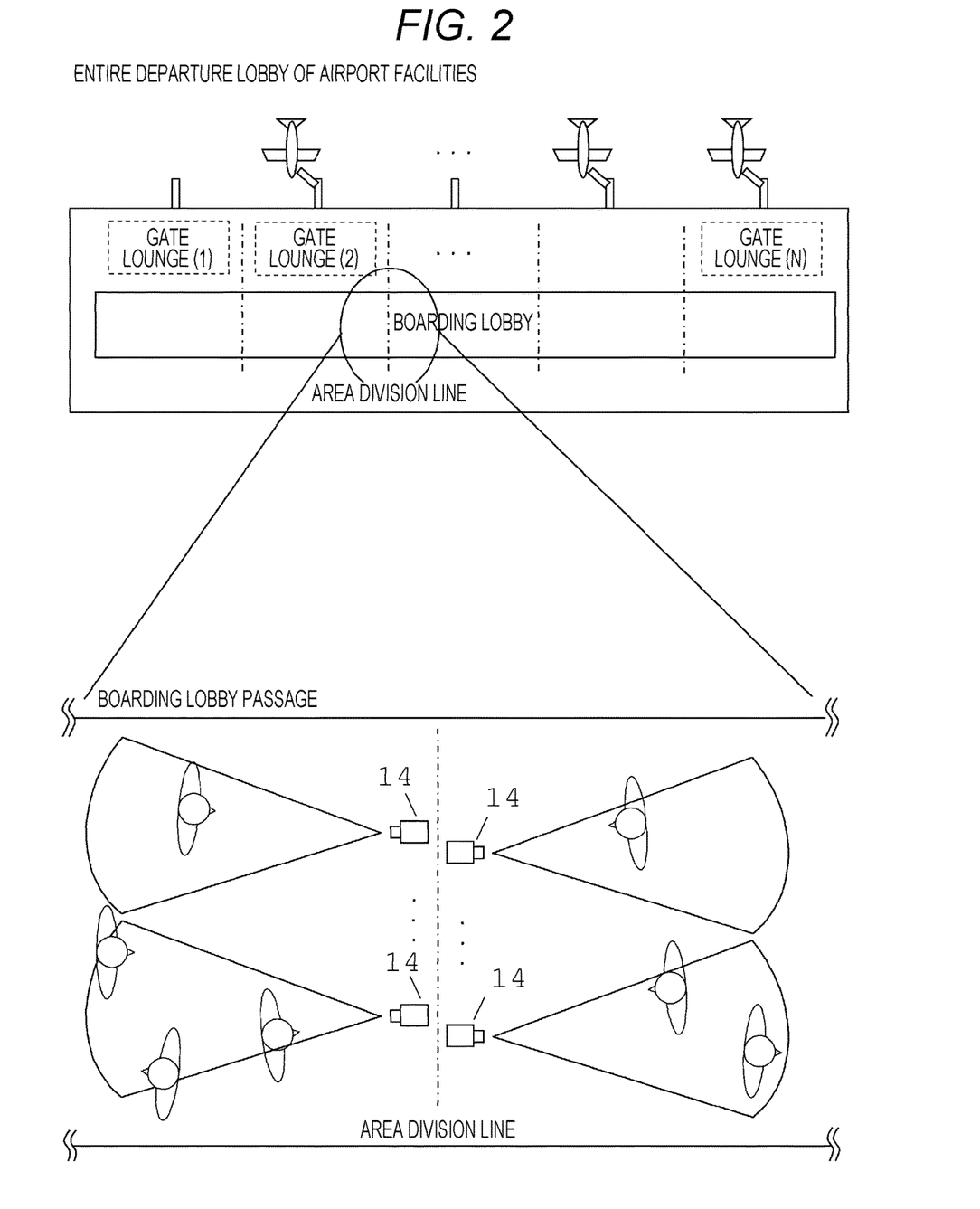
FIG. 2 is a figure illustrating how a boarding lobby is divided into areas and managed.

FIG. 2 illustrates how a boarding lobby is divided into areas and managed. As shown in the drawing, in the present example, the entire boarding lobby is divided into N division areas and managed. An area division line serving as a separation between division areas is virtually set, and in two division areas divided by any given area division line, one or more monitoring cameras 14 capturing images in one of the division areas and one or more monitoring cameras 14 capturing images in the other of the division areas are installed in the opposite directions from each other with the area division line interposed therebetween. For example, along the area division line of the division area (2) and the division area (3), the monitoring camera 14 capturing images in the division area (2) located at the left side of the area division line is installed in the left direction, and the monitoring camera 14 capturing images in the division area (3) located at the right side of the area division line is installed in the right direction.

Therefore, when a boarding passenger moving across division areas goes out of one of the division areas, the boarding passenger is captured by the monitoring camera 14 capturing images of the division area in question. In this case, it is sufficient to capture an image of a boarding passenger moving across division areas in the present invention, and therefore, in the present exemplary example, the monitoring cameras 14 may be installed and the performance thereof may be such that the monitoring cameras can capture images in a portion serving as a moving path across areas, but the monitoring cameras 14 and the performance thereof may be such that the monitoring cameras can capture images of the entire division area. Each monitoring camera 14 is managed in a format in which the identification information thereof and the identification information of the division area where images are to be captured are associated with each other, so that the division area can be identified by identifying the monitoring camera 14.

The videos captured by each of the monitoring cameras 14 are separately recorded in the video recording device 17 for each of the cameras. The face feature quantity extraction/registration device 16 reads the recorded video including the face of the boarding passenger from the video recording device 17, extracts the feature quantity of the face of the boarding passenger on the basis of the video, and records the data of the face feature quantity, the identification information about the monitoring camera 14 that captured the video, and the shooting time of the video to the face feature quantity database in such a format that the data of the face feature quantity, the identification information about the monitoring camera 14 that captured the video, and the shooting time of the video are associated with each other. At this occasion, in addition to the extraction of the face feature quantity of the boarding passenger, extraction of other personal feature quantity contributing to the identification of the boarding passenger (for example, the feature quantity of the clothes) may be performed. It should be noted that the extraction of the face feature quantity (and other feature quantities) of the boarding passenger is performed from all of the frames of the video, but in the present example, the extraction is performed with every predetermined number of frames.

When the start time of boarding arrives, the boarding passenger in the area of the boarding lobby walks over to the boarding gate which is the target position where the boarding passenger has to arrive by the departure time, and presents the boarding passenger information recording medium to the boarding gate terminal 20 to have the boarding passenger information to be read, and passes the boarding gate to board the target airplane. In this case, the boarding gate terminal 20 according to the present example includes an information reading unit in various formats such as an IC chip reader and writer and a two-dimensional barcode reader in order to cope with existence of various kinds of boarding passenger information recording media.

The boarding passenger management device 19 manages a list of already boarded clients (hereinafter referred to as an onboard passenger list) and a list of clients who have not yet boarded the airplane (hereinafter referred to as a not-yet onboard passenger list) on the basis of the boarding passenger information read by the boarding passenger reception terminal 2 and the boarding passenger information read by the boarding gate terminal 20. More specifically, for example, every time the boarding passenger reception terminal 2 reads the boarding passenger information, the boarding passenger management number issued at that occasion is added to the not-yet onboard passenger list, and every time the boarding gate terminal 20 reads the boarding passenger information, the boarding passenger management number corresponding to the boarding passenger information is deleted from the not-yet onboard passenger list and at the same time, it is added to the onboard passenger list. In this case, when all the boarding passenger have board the airplane, the not-yet onboard passenger list becomes vacant.

In this case, the boarding passenger management devices 1, 9, 19 of the each block notifies the management information (or the content of change) of each of them to each other, thus synchronizing the management information. Then, when the departure time of any given flight approaches, the boarding passenger management device 9 of the operation management center checks the not-yet onboard passenger list with a predetermined interval, and determines whether there are any not-yet boarded passenger. As a result, when it is determined that there is a not-yet boarded passenger, the boarding passenger management number of the not-yet boarded passenger is given to the face feature quantity search device 10, and the face feature quantity search device 10 is commanded to perform the similar face image search.

When the face feature quantity search device 10 receives the command of the similar face image search, the data of the face feature quantity associated with the boarding passenger management number of the not-yet boarded passenger are read from the face feature quantity extraction/registration device 4 of the security inspection area, and the similar face image search is performed with the face feature quantity extraction/registration device 16 of the boarding lobby by using the face feature quantity of the not-yet boarded passenger as the search key, and the result thereof is output to the boarding passenger management device 9. In this similar face image search, the data of the face feature quantity of which degree of similarity with the face feature quantity serving as the search key is high (equal to or more than a threshold value) are searched, and the identification information and the shooting time of the monitoring camera 14 associated therewith is identified. Therefore, which monitoring camera 14 was used for a person considered to be a not-yet boarded passenger and when it was captured can be identified.

In this case, the degree of similarity of the face feature quantity can be calculated according to various methods. For example, where two face feature quantities constituted by n elements are defined as X=(x1, x2, . . . , xn), Y=(y1, y2, . . . , yn), and a weight coefficient representing the weight of each element is defined as W=(w1, w2, . . . , wn), a distance Z between two face feature quantities can be calculated according to the following (expression 1). In this case, i is a variable representing $0 \le I \le n$.

$$Z = \Sigma i(wi|xi-yi|) \quad \text{(Expression 1)}$$

This distance Z indicates that, the smaller the value is, the more similar the two face feature quantities are. For this reason, when the distance Z is less than a predetermined reference value, the degree of similarity of the two face feature quantities can be determined to be high.

In addition to the comparison of the face feature quantities, the comparison of other personal feature quantity contributing to the identification of the boarding passenger (for example, the feature quantity of the clothes) may be performed, so that the degree of accuracy of searching a person considered to be the not-yet boarded passenger can be further enhanced. Alternatively, multiple monitoring cameras 3 may be installed in proximity to the boarding passenger reception terminal 2, and the videos including the face of the boarding passenger may be captured from different directions, and the similar face image search by using the search key in the face image in each direction may be performed, so that the degree of accuracy of searching a person considered to be the not-yet boarded passenger can be further enhanced.

When a person considered to be the not-yet boarded passenger is captured by multiple monitoring cameras 14 (when there are multiple face feature quantities determined to have a high degree of similarity with the face feature quantity of the not-yet boarded passenger), the boarding passenger management device 9 organizes the identification information about the monitoring cameras 14 by sorting the identification information about the monitoring cameras 14 in the order of shooting time on the basis of the identification information and the shooting time of the monitoring camera 14 associated with the data of each face feature quantity, so that which monitoring camera 14 last captured a person considered to be the not-yet boarded passenger is estimated, and more specifically, in which division area the person considered to be the not-yet boarded passenger was located last is estimated. Therefore, the position in the area of the boarding lobby where the not-yet boarded passenger was last located can be roughly identified.

Figure 3:
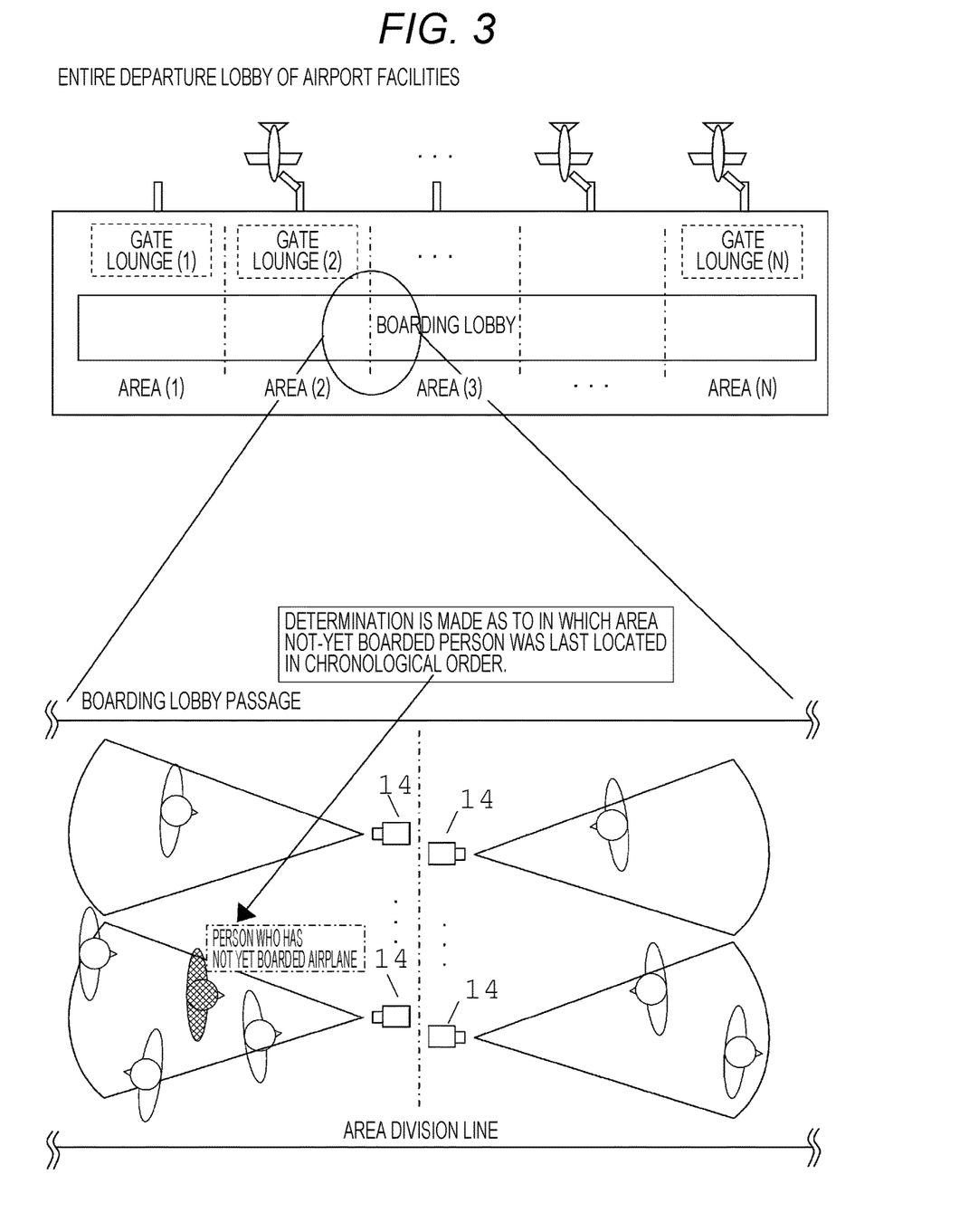
FIG. 3 is a figure illustrating an exemplary example of determining a division area where a not-yet boarded passenger is considered to be located most recently.

FIG. 3 illustrates an exemplary example of determining a division area where a not-yet boarded passenger is considered to be located most recently. In FIG. 3, a person considered to be the not-yet boarded passenger is determined to be last captured by the monitoring camera 14 installed at the area division line serving as the separation between the division area (2) and the division area (3) in such a manner that the monitoring camera 14 is in the direction toward the division area (2). Therefore, the person considered to be the not-yet boarded passenger is considered to be staying in the division area (2) or the division area (3). More specifically, the person considered to be the not-yet boarded passenger is considered to be staying in a range of the division area (2) that can be captured by the monitoring camera 14 installed at the area division line serving as the separation between the division area (2) and the division area (3) in such a manner that the monitoring camera 14 is in the direction toward the division area (2) (a region in proximity to the division area (3)), or in a range of the division area (3) that cannot be captured by the monitoring camera 14 installed at the area division line serving as the separation between the division area (3) and the division area (4) in such a manner that the monitoring camera 14 is in the direction toward the division area (3) (a region except the vicinity of the division area (4)).

Information about a processing result of the boarding passenger management device 9 and the face feature quantity search device 10 is given from the boarding passenger management device 9 to the video display device 11, the announcement transmission device 12, and the not-yet boarded passenger position display device 21, and is used when these devices output various kinds of information.

When the video display device 11 receives the identification information about the monitoring camera 14 that captured the person considered to be the not-yet boarded passenger, the information about the shooting time, and the like from the boarding passenger management device 9, the video display device 11 reads and plays back the recorded video from the video recording device 17 of the boarding lobby on the basis of the information. Therefore, the video display device 11 plays back the video starting from the video frame in which the person considered to be the not-yet boarded passenger is last captured, and the user can find the situation before and after the last capture by performing video operation. The video display device 11 also reads and displays the recorded video including the face of the not-yet boarded passenger himself/herself from the video recording device 5. Accordingly, the user can visually determine whether the person included in the video of the boarding lobby played back (the person considered to be the not-yet boarded passenger) is the not-yet boarded passenger himself/herself, and therefore, even if the degree of accuracy of the similar face image search is insufficient, this insufficiency can be compensated.

In this case where the coordinate of the region of the face image, from which the face feature quantity is extracted by the face feature quantity extraction/registration device 16 of the boarding lobby, is also recorded, the region where the face feature quantity determined to have a high degree of similarity with the face feature quantity of the not-yet boarded passenger is extracted (the region of the face of the person considered to be the not-yet boarded passenger) can displayed in such a manner that it is enclosed by a frame line and the like when the recorded video of the boarding lobby is played back, so that the face of the person considered to be the not-yet boarded passenger is more likely to be noticed by the user.

When the not-yet boarded passenger position display device 22 receives the identification information and the shooting time of the monitoring camera 14 that captured the person considered to be the not-yet boarded passenger and the information about the division area and the like where the not-yet boarded passenger is staying at from the boarding passenger management device 9, the not-yet boarded passenger position display device 22 displays various kinds of information contributing the search of the not-yet boarded passenger on the basis of the information.

Figure 4:
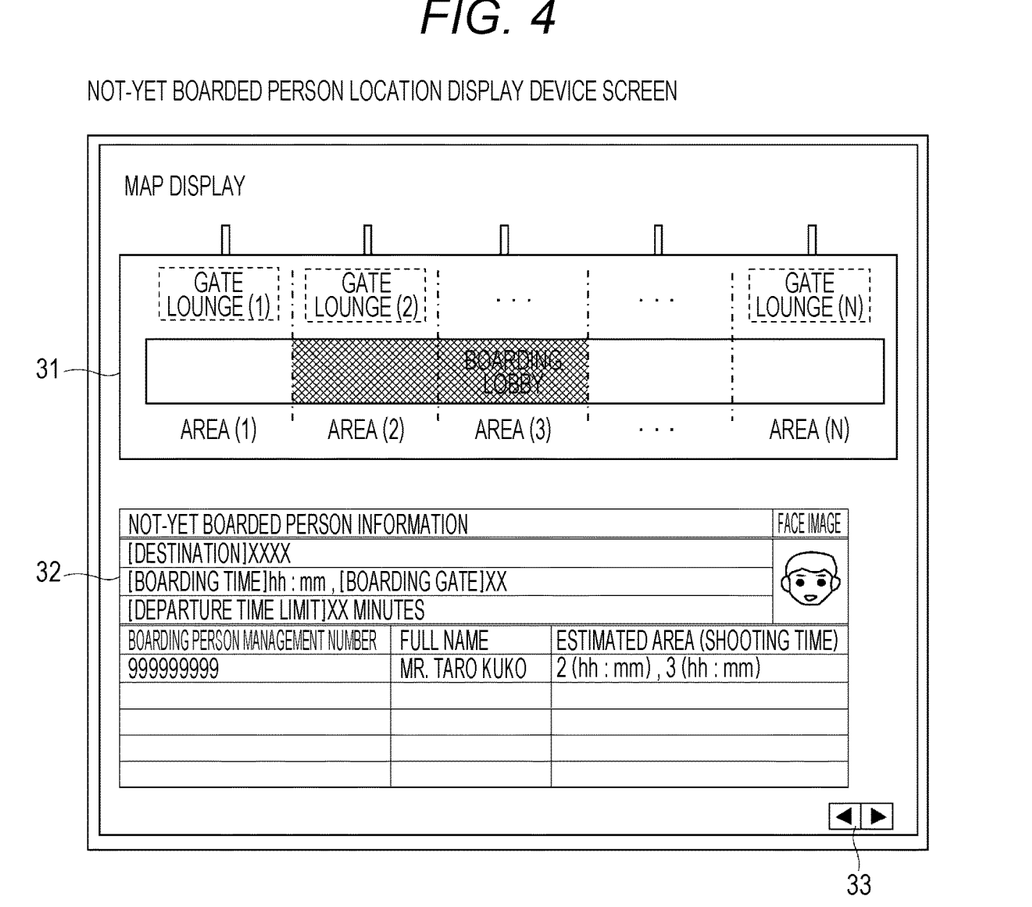
FIG. 4 is a figure illustrating an exemplary example of display by a not-yet boarded passenger position display device.

FIG. 4 illustrates an exemplary example of display by the not-yet boarded passenger position display device 22. In the present exemplary example, a map display region 31 which displays a map of the boarding lobby, a not-yet boarded passenger information display region 32 which displays information about the not-yet boarded passenger, and an operation button 33 for receiving user operation for switching a not-yet boarded passenger who is to be displayed in a case where there are multiple not-yet boarded passengers are provided on the screen of the not-yet boarded passenger position display device 22.

The map of the boarding lobby displayed in the map display region 31 is divided into multiple pieces according to the division areas, and the division area where the not-yet boarded passenger is considered to be located is displayed in an emphasized manner. In the drawing, the division area (2) and the division area (3) are displayed in an emphasized manner, and the not-yet boarded passenger is considered to be staying in these division areas. As explained with reference to FIG. 3, when the range in the division area where the not-yet boarded passenger is located at can also be estimated, a display may be presented to specifically identify the range.

Instead of the emphasized display of the division area where the not-yet boarded passenger is considered to be located at, a representation image such as an icon representing the person considered to be the not-yet boarded passenger may be displayed in the division area, and the face image of the person considered to be the not-yet boarded passenger may be displayed in the division area. In this case, when the face image of the person considered to be the not-yet boarded passenger is displayed, and the face image from which the face feature quantity is extracted by the face feature quantity extraction/registration device 16 in the boarding lobby (or the coordinate of the region) is recorded, the face image of the person considered to be the not-yet boarded passenger can be displayed easily.

The not-yet boarded passenger information display region 32 displays, as the information about the not-yet boarded passenger, the destination, the boarding time, the departure time limit, the boarding passenger management number, the full name, the estimated area (and the shooting time), and the like. When the face image from which the face feature quantity is extracted by the face feature quantity extraction/registration device 4 in the security inspection area is also recorded, the content of the display of the face image of the not-yet boarded passenger himself/herself can also be easily added as shown in FIG. 4, and this helps the user (ground worker) to search the not-yet boarded passenger in the division area in question.

In this case, in the above exemplary example, when there are multiple face feature quantities determined to have a high degree of similarity with the face feature quantity of the not-yet boarded passenger, they are organized in the order of the shooting time, and which division area the person considered to be the not-yet boarded passenger was located at is estimated and displayed, but the division area corresponding to each of these multiple face feature quantities may be displayed in an emphasized manner. More specifically, with regard to multiple persons considered to be the not-yet boarded passengers, the division area where each of them is captured may be displayed in an emphasized manner. In this case, a division area where a person having a higher degree of similarity with the not-yet boarded passenger is captured may be displayed with a greater degree of emphasis, a division area where the shooting time of the person considered to be the not-yet boarded passenger is newer may be displayed with a greater degree of emphasis, a division area may be given a weight in view of both of the degree of similarity with the not-yet boarded passenger and the shooting time, and a division area having a higher weight may be displayed with a greater degree of emphasis, so that the division area where the search of the not-yet boarded passenger should be conducted intensively can be easily found.

When multiple persons considered to be not-yet boarded passengers are detected, the division area where each person is captured may not be displayed in an emphasized manner, and a representation image or a face image of each person may be displayed in the division area in question. In this case, the degree of emphasis may be changed in accordance with the order of the degree of similarity with the not-yet boarded passenger, the degree of emphasis may be changed in accordance with the order of the shooting time, or the degree of emphasis may be changed in accordance with the order of weight derived in view of both of the order of the degree of similarity with the not-yet boarded passenger and the order of the shooting time. It should be noted that the degree of emphasis of the representation image and the face image can be expressed by using various elements such as the size and the shape of the image, the color and the thickness of the frame line.

Figure 5:
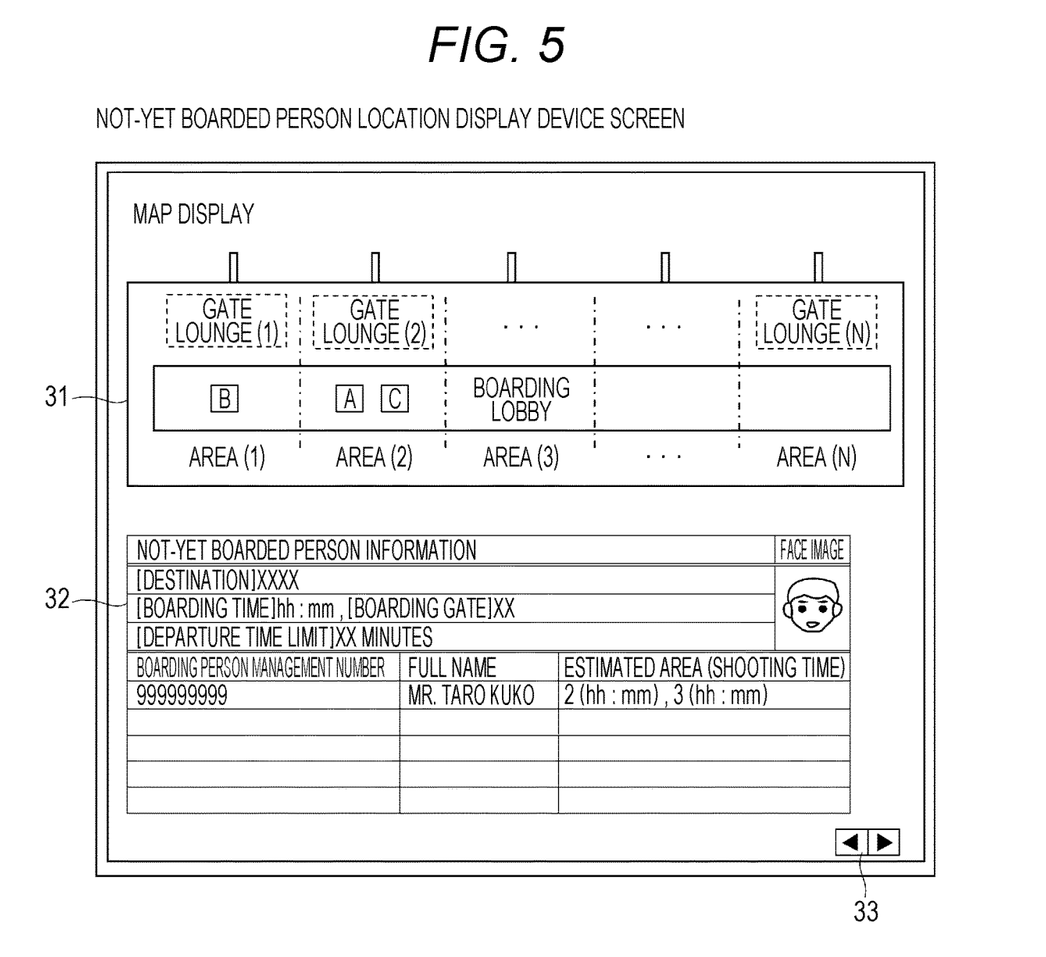
FIG. 5 is a figure illustrating another exemplary example of display by a not-yet boarded passenger position display device.

FIG. 5 illustrates an exemplary example of display in which the face images of three persons, i.e., candidates A, B, C, who are the persons considered to be the not-yet boarded passengers are respectively displayed in the division areas where they are captured. According to FIG. 5, it is possible to find that the candidates A, C are in the division area (2), and the candidate B is in the division area (1). As described above, the face image of each person considered to be the not-yet boarded passenger is displayed in the division area in question, so that even when multiple persons considered to be the not-yet boarded passengers are searched, the user can identify the not-yet boarded passenger himself/herself from among multiple persons considered to be the not-yet boarded passengers, and can find which division area the person in question was located in.

The degree of similarity with the not-yet boarded passenger and the shooting time (the recency of the shooting) may be expressed by the display position of the face image in the division area. More specifically, for example, the axis in the vertical direction in the two-dimensional plane of the map is used as the degree representing the degree of similarity, and the axis in the horizontal direction is used as the degree representing the shooting time. More specifically, a face image of a person which is considered to be a not-yet boarded passenger with a higher degree of accuracy is displayed in an upper portion of the division area, and a face image of a person of which shooting time is newer is displayed at the right side of the division area, so that it is understood that a face image closer to the upper right in the division area has a higher degree of importance. These expression methods are merely examples, and the degree of similarity with the not-yet boarded passenger and the shooting time can be expressed according to expression methods in various kinds of formats.

In the exemplary example, in a case where there are multiple not-yet boarded passengers (in a case where there are multiple boarding passenger management numbers remaining in the not-yet onboard passenger list), the user operates the operation button 33, so that a not-yet boarded passenger which is to be the display target is switched one by one, but multiple not-yet boarded passengers may be adopted as the display target at a time. In this case, for example, information about multiple not-yet boarded passengers may be displayed in the not-yet boarded passenger information display region 32 in a list format and the like as a list, and may be displayed in such a manner that it can be switched by an operation button and the like. The map of the boarding lobby displayed in the map display region 31 may be used by being divided into each of the not-yet boarded passengers, and a division area where the not-yet boarded passenger is considered to be located at (or a representation image or a face image) may be displayed in such a manner that they can be distinguished for each of the not-yet boarded passengers (for example, color coded for each of the not-yet boarded passengers).

When the announcement transmission device 12 receives the identification information and the shooting time of the monitoring camera 14 that captured the person considered to be the not-yet boarded passenger, the division area where the not-yet boarded passenger is considered to be located at, and the like, from the boarding passenger management device 9, the announcement transmission device 12 transmits voice information about an announcement for prompting the not-yet boarded passenger to board the airplane to the announcement playback device 15 of the division area where the not-yet boarded passenger is considered to be located at on the basis of the above information. The announcement playback device 15 having received the voice information from the announcement transmission device 12 outputs the voice on the basis of the received voice information. Therefore, the announcement for prompting the not-yet boarded passenger to board the airplane is output only in the division area where the not-yet boarded passenger is considered to be located.

Figure 6:
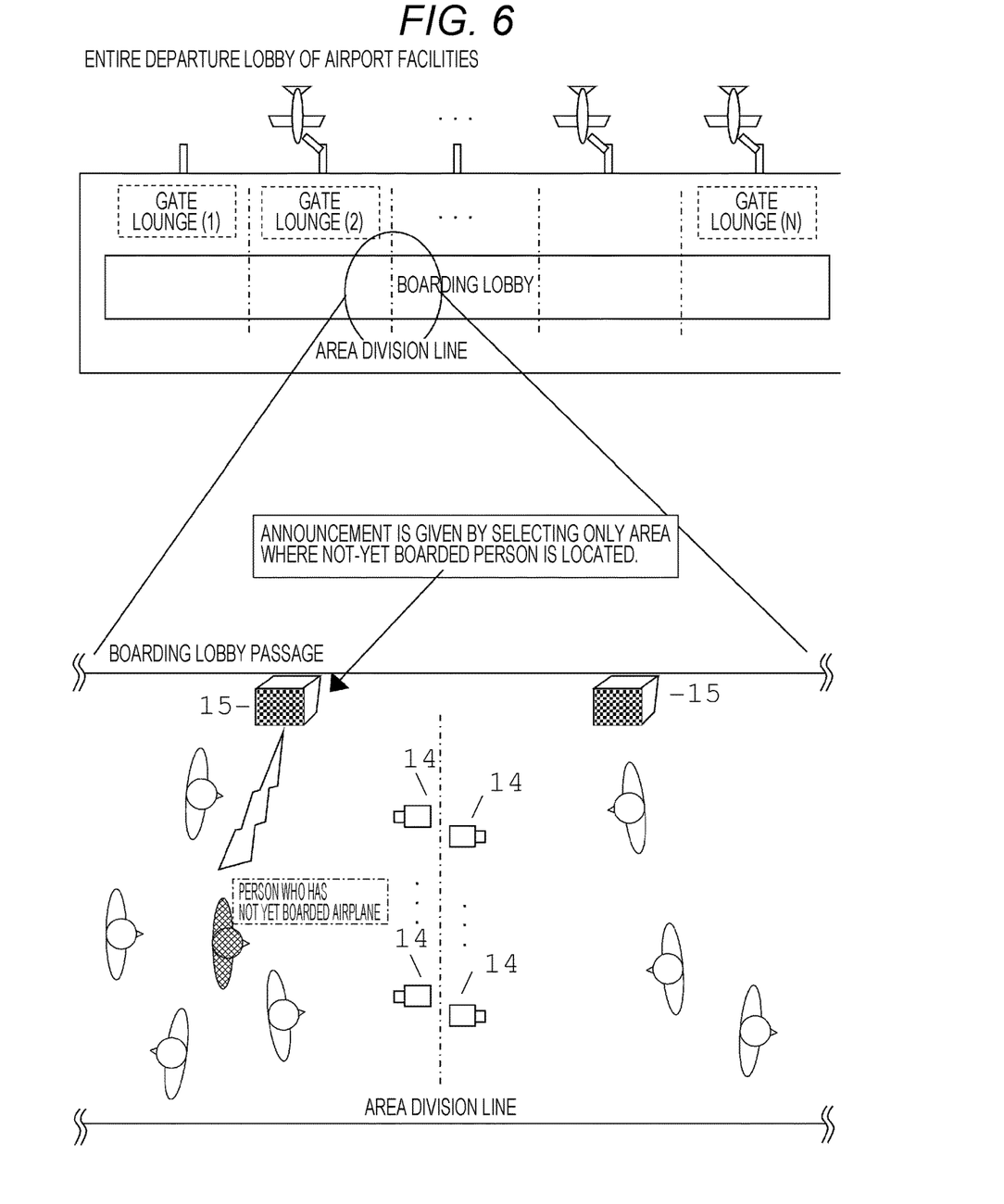
FIG. 6 is a figure illustrating an exemplary example of selectively giving announcement to only a division area where a not-yet boarded passenger is considered to be located.

FIG. 6 illustrates an exemplary example of selectively giving announcement to only a division area where a not-yet boarded passenger is considered to be located. In the example of the drawing, the announcement for prompting the not-yet boarded passenger to board the airplane is output from the announcement playback device 15 in the division area (2) where the not-yet boarded passenger is considered to be last located. Therefore, in the division area where the not-yet boarded passenger is considered not to be located, broadcast can be continued without stopping conventional announcements such as music and advertisement. This is because continuing to output a paging announcement to the entire facilities is not preferable in terms of the image for the airport facilities, and in addition, this is also in view of the fact that an individual who is paged is also ashamed of being paged.

As described above, the not-yet boarded passenger search system is configured such that the boarding passenger management device 1 and boarding passenger reception terminal 2 obtains the boarding passenger management number of the target person entering the boarding lobby (identification information), and the monitoring camera 3 installed in proximity to the boarding passenger reception terminal 2 captures an image of a target person entering the boarding lobby, and each of the monitoring cameras 14 installed in association with multiple division areas which are made by dividing the boarding lobby captures an image of each division area in the boarding lobby, and the boarding passenger management device 19 and the boarding gate terminal 20 obtain the boarding passenger management number of the target person at the boarding gate which the target person having entered the boarding lobby has to reach by the scheduled time, and the boarding passenger management devices 9, 19 identify the target person who has not yet reached the boarding gate after the scheduled time, and the boarding passenger management device 9 and the face feature quantity search device 10 identify the division area in the boarding lobby where a person considered to be a not-yet arrived target person is captured.

According to such configuration, a not-yet boarded passenger who has not yet boarded the airplane even though the departure time is approaching can be searched efficiently, and the boarding passenger management can be performed while alleviating physical fatigue of the ground worker, and this can enhance the possibility of realizing operation for causing aircrafts to depart on scheduled times. These are expected to bring about the effect of improving the on-time operation rate (on-time arrival rate) of the air carrier, and is expected to bring about not only the effect of improving the status as the air carrier but also retroactive effect of repeated use by clients who expect the accuracy in the travel time, e.g., a businessman and the like, and is also expected to have an effect of improving the benefit of the air carrier.

In this case, in the exemplary example, first obtaining unit according to the present invention is achieved by the boarding passenger management device 1 and the boarding passenger reception terminal 2, first image-capturing unit according to the present invention is achieved by the monitoring camera 3, second image-capturing unit according to the present invention is achieved by the monitoring camera 14, second obtaining unit according to the present invention is achieved by the boarding passenger management device 19 and the boarding gate terminal 20, not-yet arrived person identifying unit according to the present invention is achieved by the boarding passenger management devices 9, 19, not-yet arrived person position estimating unit according to the present invention is achieved by the boarding passenger management device 9 and the face feature quantity search device 10, and display unit according to the present invention is achieved by the not-yet boarded passenger position display device 21.

In the above explanation, the scene in which the not-yet boarded passenger is searched in the airport facilities has been explained as an example, but the video monitoring system according to the present invention can also be applied to various scenes other than the above. For example, the video monitoring system according to the present invention can also be applied to a scene for searching a person who has not yet reached a target position in other transportation facilities such as ships by a scheduled time. In addition, for example, the video monitoring system according to the present invention can also be applied to a scene for searching a person who has not yet reached a target position in other closed facilities such as hospitals by a scheduled time.

In this case, the configuration of the system, the device, and the like according to the present invention is not necessarily limited to what has been shown above, and various kinds of configurations may also be used. In addition, the present invention can also be provided as, for example, a method or a process for executing the processing according to the present invention, and as a program for realizing such method or process and a recording medium for storing the program.

INDUSTRIAL APPLICABILITY

The video monitoring system according to the present invention can be applied to various kinds of scenes for searching a person who has not yet reached a target position in a predetermined area by a scheduled time, and more particularly, the video monitoring system according to the present invention is preferably applied to searching of a not-yet boarded passenger in airport facilities.

REFERENCE SIGNS LIST 1, 9, 19: boarding passenger management device
2: boarding passenger reception terminal
3, 14: monitoring camera
4, 16, 22: face feature quantity extraction/registration device
5, 17: video recording device
6, 7, 8, 13, 18: network switch
10: face feature quantity search device
11: video display device
12: announcement transmission device
15: announcement playback device
20: boarding gate terminal
21: not-yet boarded passenger position display device
23: video display device

The invention claimed is:

1. A video monitoring method for a video monitoring system including a first obtaining unit, a second obtaining unit, a camera, a first plurality of image-capturing units, a second plurality of image-capturing units, a first processing unit, a second processing unit, and a display unit, comprising:
  obtaining, by the first obtaining unit, first identification information of a target person, from a recording medium associated with the target person, entering a predetermined area;
  capturing, by the camera, a face image of the target person;
  capturing, by the first plurality of image-capturing units, images of a first division area;
  capturing, by the second plurality of image-capturing units, images of a second division area, wherein the first plurality of image-capturing units and the second plurality of image-capturing units capture images from opposite directions of an area division line interposed between the first division area and the second division area;
  identifying, by the first processing unit, the target person who has not yet reached the target position at a certain specified time on a first basis of the first identification information of the target person obtained by the first obtaining unit and the second identification information of the target person obtained by the second obtaining unit;
  identifying, by the second processing unit, an image-capturing unit from the first plurality of image-capturing units that captured a newer image of a person considered to be the target person identified by the first processing unit and a shooting time, on a second basis of a feature quantity of the face image captured by the camera of the target person identified by the first processing unit and a feature quantity of the face image of the person included in a video captured in the first division area by the image-capturing unit; and
  displaying, by the display unit,
    a map of the predetermined area,
    the face image of the person considered to be the target person on a third basis of the second image-capturing unit,
    the shooting time identified by the first processing unit, and
    the face image of the target person captured by the camera,
  wherein, when the second processing unit identifies second image-capturing units of the plurality of the second image-capturing units that captured newer images of the person considered to be the target person, the display unit displays a plurality of the face images of the person in a division area of the map where the person is considered to be located, respectively, and
  wherein the display unit changes a degree of emphasis of the face image in the division area of the map where the person is considered to be located in accordance with a degree of similarity of the similar face image search performed by the second processing unit and the shooting time.

2. The video monitoring method of claim 1, further comprising identifying, by the second processing unit, a division area, on the second basis of a feature quantity of an image portion other than the face image.

3. The video monitoring method of claim 1, further comprising:
  recording, by the second obtaining unit, a coordinate of a region of the face image from which the face feature quantity is extracted; and
  displaying, by the displaying unit, the face image of the person considered to be the target person enclosed by a frame line based on the coordinate.

4. The video monitoring method of claim 1, further comprising:
  displaying, by the display unit, a map of the predetermined area which has a division area where the person considered to be the target person is considered to be located in an emphasized manner.

5. A video monitoring method for a video monitoring system including a first obtaining unit, a second obtaining unit, a first image-capturing unit, a plurality of second image-capturing units, a first processing unit, a second processing unit, and a display unit, comprising:
  obtaining, by the first obtaining unit, first identification information of a target person from a recording medium associated with the target person entering a predetermined area;
  capturing, by the first image-capturing unit, a face image of the target person;

capturing, by the plurality of second image-capturing units, images of each of a plurality of division areas obtained by dividing the predetermined area into a plurality of areas;

obtaining, by the second obtaining unit, second identification information of the target person from the recording medium at a target position where the target person is to reach;

identifying, by the first processing unit, the target person who has not yet reached the target position at a certain specified time on a first basis of the first identification information of the target person obtained by the first obtaining unit and the second identification information of the target person obtained by the second obtaining unit;

identifying, by the second processing unit, at least one of the plurality of second image-capturing units that captured a newer image of a person considered to be the target person identified by the first processing unit and a shooting time, on a second basis of a result of a similar face image search to detect at least one person considered to be the target person based on a feature quantity of the face image captured by the first image-capturing unit of the target person identified by the first processing unit and a feature quantity of the face image of the person included in a video captured in the plurality of division areas by the second image-capturing unit; and displaying, by the display unit,
  a map of the predetermined area,
  the face image of the person considered to be the target person on a third basis of the second image-capturing unit and the shooting time identified by the second processing unit in a division area of the map where the person is considered to be located, and
  the face image of the target person captured by the first image-capturing unit, wherein, when the second processing unit identifies second image-capturing units of the plurality of the second image-capturing units that captured newer images of multiple persons considered to be the target person, the display unit displays a plurality of the face images of each of the multiple persons in a division area of the map where the multiple persons are considered to be located, respectively, and wherein the display unit changes a degree of emphasis of the plurality of the face images of each of the multiple persons in the division area of the map in accordance with a degree of similarity of the similar face image search performed by the second processing unit and the shooting time.

6. The video monitoring method of claim 5, wherein the display unit changes a degree of emphasis of the plurality of the face images of each of the multiple persons in the division area of the map in accordance with a degree of similarity of the similar face image search performed by the second processing unit.

7. The video monitoring method of claim 5, wherein the display unit changes a degree of emphasis of the plurality of the face images of each of the multiple persons in the division area of the map in accordance with the shooting time.

8. The video monitoring method of claim 5, wherein the plurality of second image-capturing units include:
  a third plurality of image-capturing units that capture images of a first division area, and
  a fourth plurality of image-capturing units that capture images of a second division area,
    wherein the third plurality of image-capturing units and the fourth plurality of image-capturing units capture images from opposite directions of an area division line interposed between the third division area and the forth division area.

* * * * *